Oct. 12, 1954     E. SCHAFRANIK     2,691,487
COMBINATION THERMOSTATIC MIXING
AND SHUTOFF VALVE CONSTRUCTION
Filed April 4, 1952     2 Sheets-Sheet 1
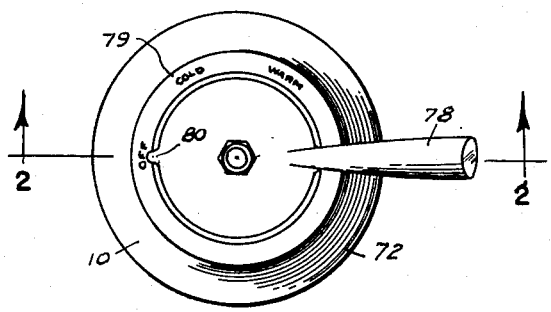
FIG. 1
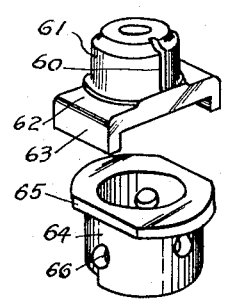
FIG. 4
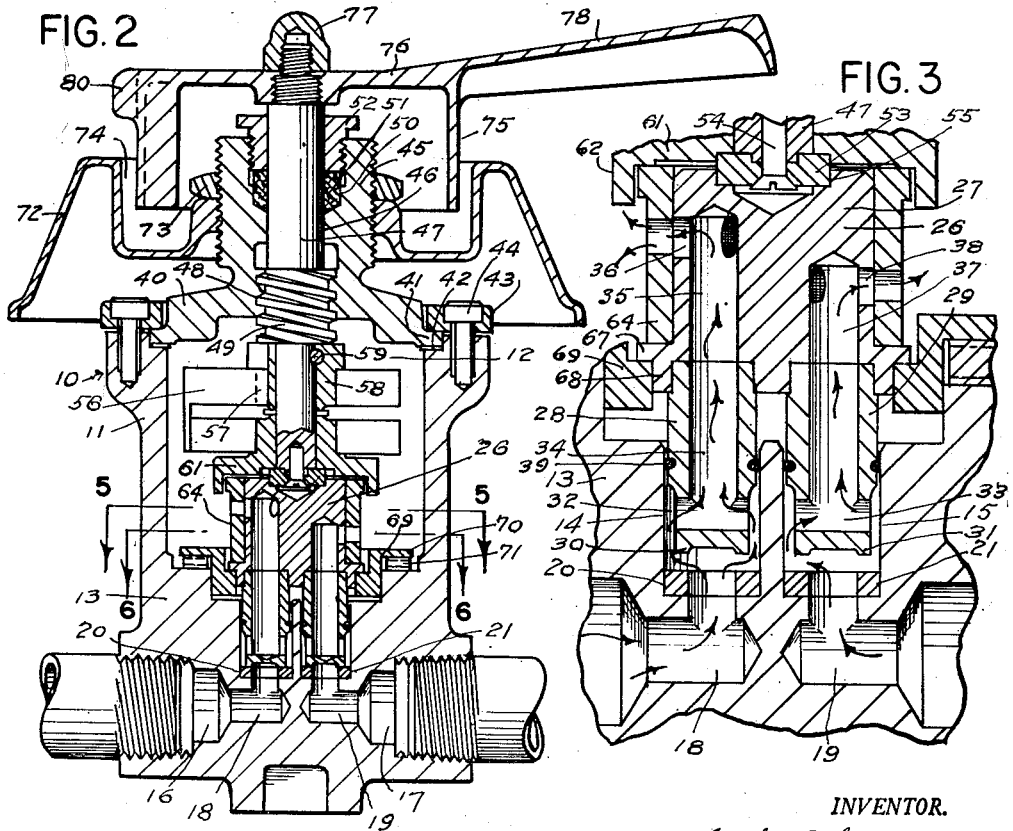
FIG. 2
FIG. 3
INVENTOR.
Erich Schafranik
BY
Nathaniel Frucht
ATTORNEY Oct. 12, 1954 E. SCHAFRANIK 2,691,487
COMBINATION THERMOSTATIC MIXING
AND SHUTOFF VALVE CONSTRUCTION
Filed April 4, 1952 2 Sheets-Sheet 2

INVENTOR.
Erich Schafranik
BY
Nathaniel Frucht
ATTORNEY

Patented Oct. 12, 1954

2,691,487

UNITED STATES PATENT OFFICE 2,691,487

COMBINATION THERMOSTATIC MIXING AND SHUTOFF VALVE CONSTRUCTION

Erich Schafranik, Providence, R. I., assignor to Leonard Valve Company, a corporation of Rhode Island Application April 4, 1952, Serial No. 280,572

4 Claims. (Cl. 236—12)

The present invention relates to the manufacture of fluid mixing devices, and has particular reference to the construction of a thermostatic mixing valve.

The principal object of the invention is to provide a thermostatic mixing valve of simple construction having an integral shut-off.

An additional object of the invention is to provide a thermostatic mixing valve having a control lever movable to set the valve for a mixed fluid of desired temperature, and movable further to shut off in-flow of hot and cold fluids.

A further object of the invention is to provide a thermostatic mixing valve having a shut-off closing positively on closing movement of a control lever and opening in response to fluid and spring pressure.

Another object of the invention is to provide a thermostatic mixing valve having a small number of readily assembled parts.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Fig. 1 is a top plan view of an illustrative valve embodying the invention;

Fig. 2 is an enlarged vertical section on the line 2—2 of Fig. 1, the valve being in shut-off position;

Fig. 3 is an enlarged sectional detail of the valve parts in open position;

Fig. 4 is a perspective view of the valve rotor and its turning element;

It has been found desirable to provide a combination thermostatic mixing and shut-off valve which has a small number of readily assembled parts, and which has a control member such as a lever for setting the valve to thermostatically regulate inflow of hot and cold fluids for providing a mixed fluid of a desired temperature, the control member being additionally movable to shut-off inflow of the hot and cold fluids. To this end, I provide a valve housing having inflow channels for hot and cold fluids, and one or more outflow channels for mixed fluid, and I mount a valve member in the housing comprising a closure member with flow passageways and a movable member with cooperating flow parts to control inflow of the hot and cold fluids into the housing. I mount a thermostatic coil element in the housing to be contacted by the inflowing hot and cold fluids and the outflowing mixed fluid, and I connect the coil element to the valve movable member to vary the flow port areas in accordance with temperature changes, the coil element being connected to a control member such as a lever for initial setting; and I further operatively connect the control member to the valve closure member to shift the valve closure member in closing relation to the housing inflow channels, whereby the control member may be set to provide a mixed fluid of predetermined temperature and may be moved to shut off inflow of both hot and cold fluids into the housing.

Figure 8:
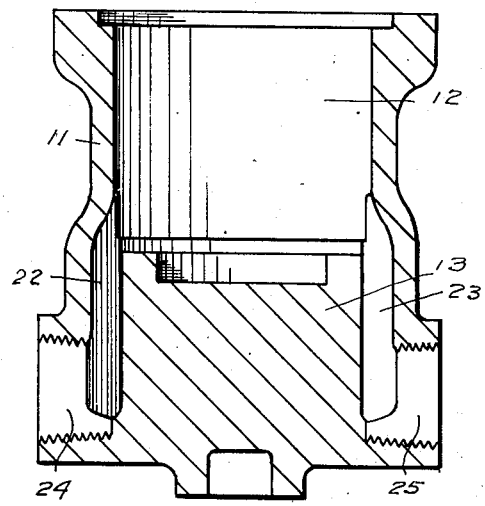
Fig. 8 is a sectional detail of the valve housing.

Referring to the drawings, which illustrate a preferred embodiment of the invention, the combination thermostatic mixing and shut-off valve 10 includes a housing 11 of generally cylindrical form, having an upper mixing chamber 12 and a lower fluid inflow section 13 provided with two vertical cylindrical bores 14, 15. Two diametrically opposite inlet passageways 16, 17 for receiving hot and cold water pipes communicate with right angled channels 18, 19 which communicate with the bores 14, 15, the channels being of smaller width than the bores to provide seats at the lower ends of the bores for receiving annular packings 20, 21. As illustrated in Fig. 8, side channels 22, 23 at right angles to the inlet passageways communicate the mixing chamber with outflow openings 24, 25 adapted to receive piping for outflow of mixed fluid.

A reciprocable closure valve member 26, see Figs. 2 and 3, has an upper generally cylindrical portion 27 with its lower surface recessed to receive cylindrical plugs 28, 29, the plugs being slidably received in the housing bores 14, 15 and having terminal annular ribs 30, 31 adapted to seat on the packings 20, 21. Each plug is recessed or cut away at the sides, as indicated by the numeral 32, see Fig. 3, and has a cross bore 33 and a central bore 34, and the upper cylindrical portion has a bore 35 in alignment with bore 34 of one plug and a transverse port 36, and a second bore 37 of shorter length in alignment with the bore 34 of the second plug and a transverse port 38, whereby the incoming fluids may enter when the closure member is moved upwardly, to pass through the bores, which constitute flow passages for the hot and cold fluids, without mixing and to enter the mixing chamber 12 through the transverse ports 36 and 38.

Figure 5:
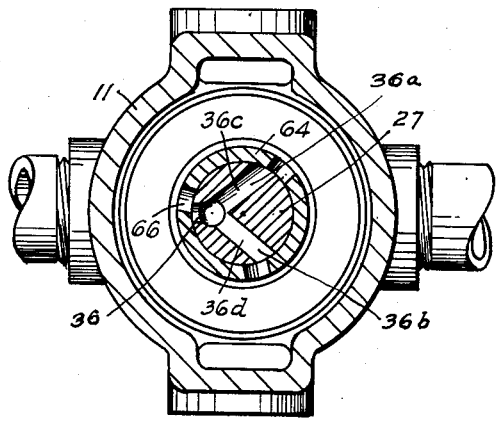
Fig. 5 is an enlarged sectional detail on the line 5—5 of Fig. 2.
Figure 6:
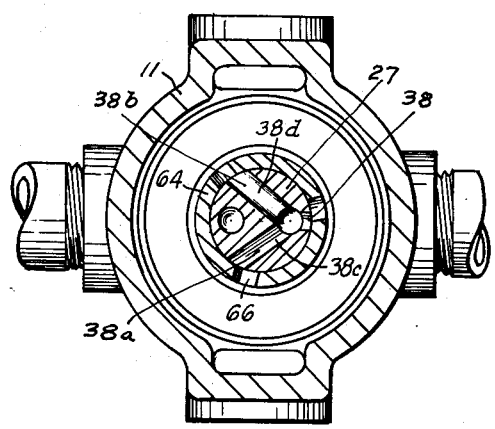
Fig. 6 is an enlarged sectional detail on the line 6—6 of Fig. 2.

Although one transverse port may be used for the hot fluid and one for the cold fluid, it is preferred to provide two additional ports 36a, 36b, for the hot fluid and two additional ports 38a, 38b for the cold fluid by forming cross bores 36c, 36d, and 38c, 38d, in the upper closure valve portion 27 as illustrated in Figs. 5 and 6, and ring packings 39 may be inset in the outer surfaces of the plugs 28, 29 for engaging the inner surfaces of the housing bores 14, 15 to prevent side leakage past the plugs.

Referring now to Fig. 2, the housing 11 has its upper end closed by a cover 40, which has an annular rim flange 41 seated in a circular recess 42 of the housing, an annular lock ring 43 extending over the rim flange 41 and being secured to the housing 11 by bolts 44. The cover 40 has an upstanding central portion 45 and is axially bored as indicated at 46 to receive a valve stem 47, the lower portion 48 of the bore 46 being recessed and internally threaded to receive a correspondingly threaded portion 49 of the valve stem to provide a spiral joint connection, and the upper portion 50 of the bore 46 being recessed to receive an annular packing 51 and threaded to receive a packing lock nut 52.

The lower portion of the valve stem 47 is reduced in diameter and has a terminal disk 53 of slightly larger diameter secured thereto as by a screw 54, the disk 53 being slidably received in a corresponding annular recess 55 in the upper portion 27 of the closure valve member 26. A thermostatic coil 56, preferably of the multiple type, has its upper end received in a vertical slot 57 of a bushing 58 which is locked to the valve stem lower portion by a key 59, the lower coil end being received in a vertical slot 60 of a turning element 61 which is rotatably mounted on the lower portion of the valve stem and has a yoke bar 62 with two parallel end flanges 63 depending therefrom.

A cylindrical valve shell 64 is rotatably mounted on the upper closure valve member portion 27, and has diametrically opposite parallel flat portions or recesses 65 slidably engaged by the end flanges 63 of the end flanges 63 of the yoke bar 62, the valve shell 64 having port openings 66 through the wall thereof positioned to successively engage the ports 36, 36a, 36b and 38, 38a, 38b of the closure member.

Figure 7:
Fig. 7 is an enlarged perspective view of the thrust spring element.

The lower end of the valve shell 64 seats on a flange 67, see Fig. 3, at the lower end of the closure valve member upper portion, the flange 67 in conjunction with an annular depending rim 68 of the closure valve upper portion forming a seat for a lift ring 69 of generally Z shape, see Fig. 2, which has a lateral annular flange 70 overlying the body portion of the housing; a flexible annular spring 71, see Fig. 7, is seated between the flange 70 and the housing body portion to continuously exert an upward lifting pressure on the closure valve member.

A cover shell 72, see Fig. 2, is threaded on the upstanding central portion 45 of the housing top, and is locked in place by a lock nut 73. The shell 72 has an upper central annular recess 74 in which the depending edge 75 of a cup-shaped regulator 76 can turn, the regulator being locked to the threaded reduced upper end of the valve shaft by a lock nut 77 and having a manually movable control handle 78 for turning. The cover shell 72 has graduations 79 thereon, and the regulator has a temperature indicating pointer 80, see Fig. 1; a stop element (not shown) of standard type and engaged by the base of the pointer 80 may be positioned on the shell 72 to limit turning movement at the hot fluid end.

Figure 9:
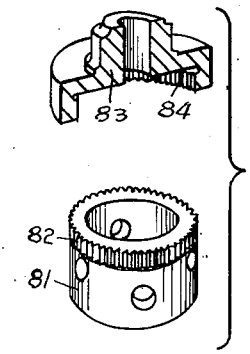
Fig. 9 is an enlarged perspective detail of a modified construction of the valve rotor and its turning part, the turning part being in section.

Although the yoke bar turning element 61 and the flat sided valve shell 64 illustrated in Fig. 4 are preferred for turning the valve shell, an alternative arrangement shown in Fig. 9 may be used, the rotary valve shell 81 having vertical splines 82 around its upper surface and the turning element 83 having a depending circular flange 84 with cooperating interior vertical splines 85, whereby adjustment setting of the shell and the turning element are facilitated.

The operation of the combination thermostatic mixing and shut-off valve may now be summarized. The control handle is turned to position the temperature indicating pointer at a desired temperature for the mixed fluid; turning the handle from the "off" position lifts the valve stem, and the annular lift spring and pressure of hot and cold fluid on the bases of the valve plugs lifts the valve closure member and allows the hot and cold fluids to enter and pass through the valve plug bores, the valve closure member bores and ports and the valve shell ports and into the mixing chamber. The hot and cold fluids mix and the thermostatic coil unit, in response to changes in the mixture temperature, expands or contracts and thus turns the valve shell through the turning member to shift the relation of the valve shell ports to the valve member closure ports, these ports being arranged so that a shift in one direction, for example, decreases the flow area for hot fluid and increases the flow area for cold fluid, and vice versa. The invention thus functions as a mixing device for normal operation; when the control handle is turned to "off" position, the valve stem is lowered and presses the closure valve member down to seat the valve plugs against their seat washers, thus shutting off inflow of both hot and cold fluids. In this "off" position there is constant lifting pressure on the closure valve member exerted by the annular spring and by the fluid pressures on the bases of the plugs, whereby turning the control handle and lifting the valve stem unseats the plugs from their seats.

The described construction thus utilizes a small number of readily manufactured and assembled parts to provide a very effective automatic mixing and shut-off combination. Although I have described a specific constructional embodiment of the invention, it is obvious that changes in the size, shape, and arrangement of the parts may be made for different valve requirements, without departing from the spirit and the scope of the invention as defined in the appended claims.

I claim:

1. A combination thermostatic fluid mixing and shutoff valve, comprising a housing having a fluid mixing chamber and a fluid inflow section with hot and cold fluid inlet passageways, a reciprocable member in said inflow section having hot and cold fluid flow passages and movable in one direction to position said passages in open communication with the inlet passageways and in the opposite direction to position said passages to close the communication, means normally urging the reciprocable member to open said communication, said flow passages having hot and cold fluid outflow ports to the mixing chamber, valve means rotatably seated on the reciprocable member and movable to proportionally regulate outflow of hot and cold fluid from the outflow ports, thermostatic means in the mixing chamber operable in response to variations in temperature of the mixed fluid to move said valve means, and manually movable control means engaging said thermostatic means and movable to set the thermostatic means for obtaining a desired mixed fluid temperature, said control means being movable to press the reciprocable member to close the communication.

2. A combination thermostatic fluid mixing and shutoff valve, comprising a housing having a fluid mixing chamber and a fluid inflow section with hot and cold fluid inlet passageways, a reciprocable member in said inflow section having hot and cold fluid flow passages and movable in one direction to position said passages in open communication with the inlet passageways and in the opposite direction to position said passages to close the communication, means normally urging the reciprocable member to open said communication, said flow passages having laterally positioned hot and cold fluid outflow ports to the mixing chamber, valve means rotatably seated on the reciprocable member and movable to proportionally regulate outflow of hot and cold fluid from the outflow ports, thermostatic means in the mixing chamber operable in response to variations in temperature of the mixed fluid to move said valve means, and manually movable control means engaging said thermostatic means and movable to set the thermostatic means for obtaining a desired mixed fluid temperature, said control means being movable to press the reciprocable member to close the communication.

3. A combination thermostatic fluid mixing and shutoff valve, comprising a housing having a fluid mixing chamber and a fluid inflow section with hot and cold fluid inlet passageways, said housing having a cover, a reciprocable member in said inflow section having hot and cold fluid flow passages and movable in one direction to position said passages in open communication with the inlet passageways and in the opposite direction to position said passages to close the communication, means normally urging the reciprocable member to open said communication, said flow passages having hot and cold fluid outflow ports to the mixing chamber, valve means rotatably seated on the reciprocable member and movable to proportionally regulate outflow of hot and cold fluid from the outflow ports, thermostatic means in the mixing chamber operable in response to variations in temperature of the mixed fluid to move said valve means, and manually movable control means including a valve stem having a spiral joint connection with the cover and engaging said thermostatic means and movable to set the thermostatic means for obtaining a desired mixed fluid temperature, said control means being movable to press the reciprocable member to close the communication.

4. A combination thermostatic fluid mixing and shutoff valve, comprising a housing having a fluid mixing chamber and a fluid inflow section with hot and cold fluid inlet passageways, said housing having a cover, a reciprocable member in said inflow section having hot and cold fluid flow passages and movable in one direction to position said passages in open communication with the inlet passageways and in the opposite direction to position said passages to close the communication, means normally urging the reciprocable member to open said communication, said flow passages having laterally positioned hot and cold fluid outflow ports to the mixing chamber, valve means rotatably seated on the reciprocable member and movable to proportionally regulate outflow of hot and cold fluid from the outflow ports, thermostatic means in the mixing chamber operable in response to variations in temperature of the mixed fluid to move said valve means, and manually movable control means including a valve stem having a spiral joint connection with the cover and engaging said thermostatic means and movable to set the thermostatic means for obtaining a desired mixed fluid temperature, said control means being movable to press the reciprocable member to close the communication.

References Cited in the file of this patent

UNITED STATES PATENTS

| Number | Name | Date |
|---|---|---|
| 1,954,903 | Walker | Apr. 17, 1934 |
| 2,132,689 | Hermann | Oct. 11, 1938 |
| 2,180,362 | Leonard | Nov. 21, 1939 |
| 2,382,283 | Barnett | Aug. 14, 1945 |
| 2,585,726 | Barker | Feb. 12, 1952 |
| 2,606,717 | Barker | Aug. 12, 1952 |